(12) United States Patent
Yamato et al.

(10) Patent No.: US 7,181,903 B2
(45) Date of Patent: Feb. 27, 2007

(54) EXHAUST GAS PURIFYING APPARATUS AND METHOD OF USING THE SAME

(75) Inventors: Masanori Yamato, Toyota (JP); Masaru Kakinohana, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/845,161

(22) Filed: May 14, 2004

(65) Prior Publication Data

US 2004/0231321 A1    Nov. 25, 2004

(30) Foreign Application Priority Data

May 20, 2003    (JP)    ............... 2003-142332

(51) Int. Cl.
*F01N 3/00*    (2006.01)
(52) U.S. Cl. ............... 60/275; 60/286; 60/297; 60/301; 60/303; 422/186.03; 422/186.04; 422/186.1
(58) Field of Classification Search ............. 60/274, 60/275, 295, 297, 299, 300, 301, 303, 286; 422/186.03, 186.04, 186.1, 186.19, 186.22
See application file for complete search history.

(56) References Cited

U.S. PATENT DOCUMENTS

| | | | |
|---|---|---|---|
| 5,746,984 A * | 5/1998 | Hoard | 422/169 |
| 5,893,267 A * | 4/1999 | Vogtlin et al. | 60/274 |
| 6,038,854 A * | 3/2000 | Penetrante et al. | 60/297 |
| 6,238,525 B1 | 5/2001 | Lox et al. | |
| 6,334,986 B2 * | 1/2002 | Gieshoff et al. | 423/239.1 |
| 6,363,716 B1 * | 4/2002 | Balko et al. | 60/286 |
| 6,887,438 B2 * | 5/2005 | Labarge et al. | 422/177 |
| 6,994,830 B1 | 2/2006 | Raybone et al. | |
| 2002/0194835 A1 | 12/2002 | Bromberg et al. | |
| 2003/0077212 A1 | 4/2003 | Hammer | |

FOREIGN PATENT DOCUMENTS

| | | | | |
|---|---|---|---|---|
| JP | A 08-014035 | 1/1996 | | |
| JP | A 2001-182525 | 7/2001 | | |
| JP | A 2002-155731 | 5/2002 | | |
| JP | A 2002-221027 | 8/2002 | | |
| JP | A 2003-512167 | 4/2003 | | |
| WO | WO 99/32213 | * | 7/1999 | ............... 60/275 |
| WO | WO 01/83087 A1 | 11/2001 | | |

* cited by examiner

*Primary Examiner*—Binh Q. Tran
(74) *Attorney, Agent, or Firm*—Oliff & Berridge, PLC

(57) ABSTRACT

The present invention relates to an exhaust gas purifying apparatus comprising a plasma reactor containing at least one of a $H_2O$ adsorbent and a HC adsorbent; and a $NO_x$ adsorbent located downstream of said plasma reactor. Further, the present invention relates to an exhaust gas purifying apparatus comprising a plasma reactor containing at least one of a $H_2O$ adsorbent and a HC adsorbent, and a $NO_x$ adsorbent. Still further, the present invention relates to a method using the present apparatus. According to the present apparatus, by generating plasma in the plasma reactor, $H_2O$ trapped on the $H_2O$ adsorbent is activated to be a strong oxidant such as OH radical and O radical, and HC trapped on the HC adsorbent is activated to be radicals, lower HCs, etc.

8 Claims, 2 Drawing Sheets

EXHAUST GAS PURIFYING APPARATUS AND METHOD OF USING THE SAME

BACKGROUND OF THE INVENTION

1. Field of the Invention

The present invention relates to an apparatus for purifying exhaust gas emitted from internal combustion engine and, in particular, to an apparatus for purifying $NO_x$ (nitrogen oxide) emitted from a motor vehicle.

2. Description of Related Art

In order to purify an exhaust gas emitted from an internal combustion engine such as a motor vehicle, it is usual to reduce $NO_x$ in the exhaust gas by the use of $NO_x$ purifying catalyst carrying a noble metal. However, it is necessary to use a larger amount of noble metal, to sufficiently purifying $NO_x$ at a lower temperature, as the $NO_x$ purifying catalyst generally does not have much $NO_x$ purifying ability at the lower temperature. Using the larger amount of noble metal increases costs and does not always provides a satisfactory result.

Japanese Unexamined Patent Publication NO. 2001-182525 describes an exhaust gas purifying apparatus wherein plasma is generated in a plasma reactor to enhance the adsorption of $NO_x$ by a $NO_x$ adsorbent therein, when a $NO_x$ purifying catalyst located downstream thereof is at a low temperature and does not have enough $NO_x$ purifying ability. Once the catalyst in warmed up, the trapped $NO_x$ can be desorbed and purified at the downstream $NO_x$ purifying catalyst by stopping plasma.

The prior art has partially overcome the problem that the $NO_x$ purifying catalyst does not have enough NO, purifying ability before it is warmed up. However, the further improvements are required because the $NO_x$ purifying ability is not always enough even if the prior art is employed.

Therefore, the present invention provides an improved exhaust gas purifying apparatus, which overcome the above problems, and a method for using it.

BRIEF SUMMARY OF THE INVENTION

An exhaust gas purifying apparatus according to the present invention comprises a plasma reactor containing at least one of a $H_2O$ adsorbent and a HC (hydrocarbon) adsorbent; and a $NO_x$ adsorbent located downstream of said plasma reactor.

Another exhaust gas purifying apparatus according to the present invention comprises a plasma reactor containing at least one of a $H_2O$ adsorbent and a HC adsorbent, and a $NO_x$ adsorbent. The $NO_x$ adsorbent in the reactor may be positioned downstream of the at least one of a $H_2O$ adsorbent and a HC adsorbent. Further, the $NO_x$ adsorbent may be mixed with the at least one of a $H_2O$ adsorbent and a SC adsorbent.

In the use of the present exhaust gas purifying apparatuses, at least one of $H_2O$ and HC in an exhaust gas is adsorbed on the at least one of a $H_2O$ adsorbent and a HC adsorbent, when the exhaust gas is passed through the plasma reactor. On generating plasma in the plasma reactor, the $H_2O$ adsorbed on the adsorbent is activated to be a strong oxidant such as OH radical and O radical, and HC adsorbed on the adsorbent is activated to be radicals, lower HC, etc. The obtained radicals facilitate the conversion from NO to $NO_2$ in the exhaust gas. The resulting $NO_2$ tends to be more adsorbed onto the downstream $NO_x$ adsorbent than $NO_x$. Therefore, according to the present apparatus, it is possible to prevent $NO_x$ from flowing out from an exhaust gas purifying apparatus at a lower temperature without increasing an amount of noble metal to be used.

In one embodiment of the present apparatus, the at least one of a $H_2O$ adsorbent and a HC adsorbent is selected from the group consisting of alumina, silica, zeolite, zirconia and meso-porous silica, and combinations thereof.

In another embodiment of the present apparatus, the $NO_x$ adsorbent is selected from the group consisting of zirconia and ceria, and a combination thereof.

In another embodiment of the present apparatus, the $NO_x$ adsorbent carries a $NO_x$ purifying catalyst.

According to this embodiment of the present apparatus, it is possible to adsorb $NO_2$ obtained by the at least one of a $H_2O$ adsorbent and a HC adsorbent onto the $NO_x$ adsorbent and to purify the adsorbed $NO_2$ thereon.

In another embodiment of the present apparatus, it comprises a $NO_x$ purifying catalyst located downstream of the $NO_x$ adsorbent.

According to this embodiment of the present apparatus, the $NO_x$ desorbed from $NO_x$ adsorbent after the temperature of the $NO_x$ adsorbent is raised can be converted into $N_2$ by the $NO_x$ purifying catalyst which has already been warmed up.

In the present apparatuses, it is also possible to reduce an amount of noble metal, such as a platinum group metal, used in the $NO_x$ purifying catalyst, or further to omit the noble metal, because NO in the exhaust gas has been converted into $NO_2$ which is easily adsorbed onto a $NO_x$ adsorbent and a $NO_x$ purifying catalyst.

A method according to the present invention for using the present exhaust gas purifying apparatus comprises generating a plasma in the plasma reactor only when the temperature of the $NO_x$ purifying catalyst is lower than a predetermined temperature, e.g. lower than 300° C.

According to the present method, it is possible to promote the conversion from NO to $NO_2$, and thereby promote adsorption of $NO_x$ onto the $NO_x$ adsorbent, only when the $NO_x$ purifying catalyst is at the lower temperature such that $NO_x$ in an exhaust gas cannot be sufficiently purified by the $NO_x$ purifying catalyst. Further, according to the present method, it is possible to stop the generation of plasma, in order to save energy, when the $NO_x$ purifying catalyst is at a high enough temperature and has enough $NO_x$ purifying ability.

These and other objects, features and advantages of the present invention will become apparent to a person with ordinary skill in the art upon reading the following detailed description along with the drawings.

DETAILED DESCRIPTION OF THE INVENTION

The present invention is described regarding embodiments and drawings which are not intended to limit the scope of the present invention shown in the claims.

The first and second embodiments of the present exhaust gas purifying apparatuses are described in relation to FIGS. 1 and 2, below.

Figure 1:
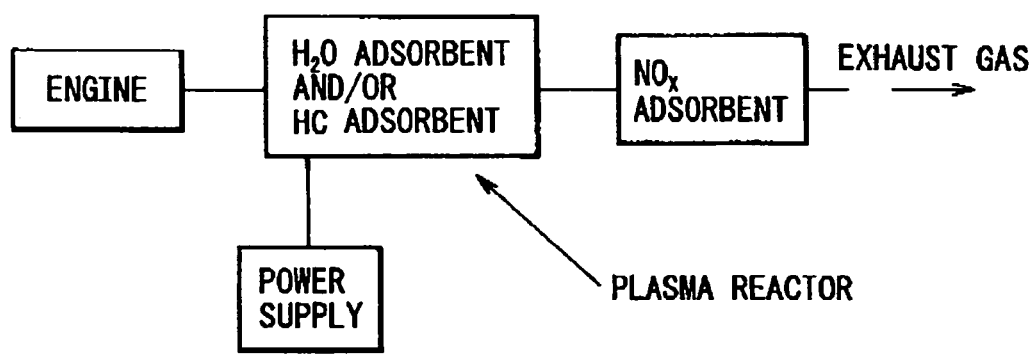
FIG. 1 is a block diagram of one embodiment of the present exhaust gas purifying apparatus.

In the use of the apparatus shown in FIG. 1, an exhaust gas emitted from an engine is passed through the plasma reactor containing at least one of a $H_2O$ adsorbent and a HC adsorbent, and then a $NO_x$ adsorbent located downstream of the plasma reactor. In the use of the apparatus shown in FIG. 2, an exhaust gas emitted from an engine is passed through a plasma reactor containing a $NO_x$ adsorbent, and at least one of a $H_2O$ adsorbent and a HC adsorbent in a plasma reactor. The adsorbent in the plasma reactor adsorbs $H_2O$ and/or HC, and then the adsorbed $H_2O$ and/or HC is decomposed into radical chemicals by applying plasma. The radial chemicals enhance oxidizing NO into $NO_2$.

Figure 2:
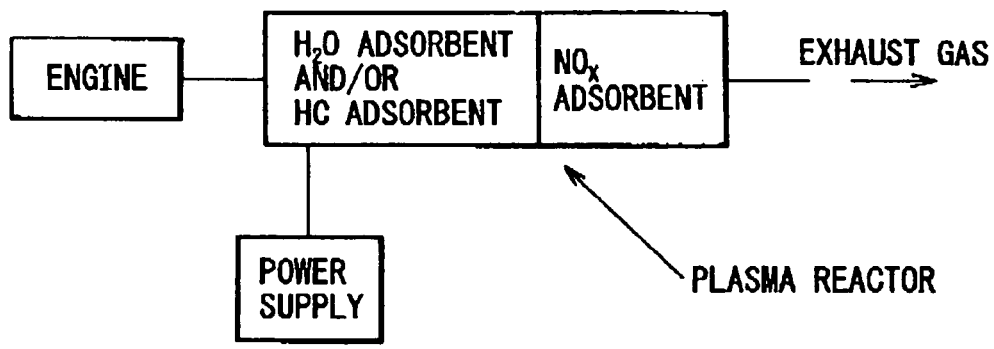
FIG. 2 is a block diagram of another embodiment of the present exhaust gas purifying apparatus.

The components of the exhaust gas purifying apparatus shown in FIGS. 1 and 2 are described below in more detail.

The $H_2O$ adsorbent used for the exhaust gas purifying apparatus of the present invention may be any kind of a $H_2O$ adsorbent, e.g. at least one of alumina, silica and zeolite. The HC adsorbent used for the exhaust gas purifying apparatus of the present invention may be any kind of HC adsorbents, e.g. at least one of zeolite, zirconia and meso-porous silica.

The $NO_x$ adsorbent used for the exhaust gas purifying apparatus of the present invention may be any kind of adsorbent which adsorbs $NO_x$, in particular adsorbents which desorb the adsorbed $NO_x$ at the higher temperature, e.g. at least one of zirconia and ceria.

The adsorbents may be in any form, e.g. it can be formed into pellet form and charged into a container, or molded into a honeycomb structure. Further, it is also possible to coat the slurry containing the adsorbent onto a honeycomb structure substrate, and dry and fire the coated substrate.

The $NO_x$ purifying catalyst which is carried onto the $NO_x$ adsorbent and/or located downstream of the $NO_x$ adsorbent is any kind of catalyst a which catalyze reduction from $NO_x$ to $N_2$. The $NO_x$ purifying catalyst may be so-called a $NO_x$ storage reduction catalyst, a $NO_x$ selective reduction catalyst or a three-way catalyst.

The $NO_x$ storage reduction catalyst is a catalyst which stores $NO_x$ when air/fuel ratio is in lean, and reduces the stored $NO_x$ into $N_2$ when air/fuel ratio is in rich, i.e. when a rich spike is provided (when fuel is injected into an exhaust gas flow). For example, the $NO_x$ storage reduction catalyst is a catalyst wherein a porous metal oxide carrying one or more noble metal such as Pt, Rh, Pd, Ir and RU, and one or more $NO_x$ storage elements such as alkali metals, alkali earth metals and rare earth metals.

The $NO_x$ selective reduction catalyst is a catalyst which selectively reduce or decompose $NO_x$ in an exhaust gas. The $NO_x$ selective reduction catalyst is used for purifying $NO_x$ in the exhaust gas emitted from an internal combustion engine driven at a lean air/fuel ratio. For example, the $NO_x$ selective reduction catalyst is a zeolite exchanged with transition metal such as Cu, or zeolite or alumina carrying one or more noble metal.

The three-way catalyst is a catalyst which converts CO, HC and $NO_x$ in an exhaust gas emitted from an internal combustion engine driven at near theoretical air/fuel ratio into $CO_2$, $H_2O$ and $N_2$. For example, the three way catalyst is an alumina carrying mixture of Pt and Rh, or mixture of Pd and Rh.

The catalyst metals such as noble metal can be carried onto any kind of substrate such as formed substrate or powder substrate by wash coating etc. Further, a formed substrate such as honeycomb substrate may be coated with the slurry comprising the particle carrying catalyst metals, and then dried and fired to obtain a formed substrate carrying catalyst. The particle carrying catalyst metals may be formed into pallet form and charged into a container.

Figure 3A:
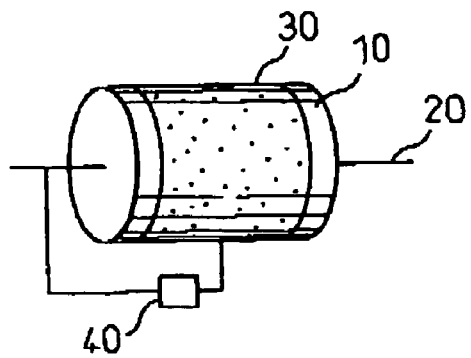
FIGS. 3a and 3b are respectively a perspective view and a cross sectional view of one plasma reactor which can be used for the present exhaust gas purifying apparatus.
Figure 3B:
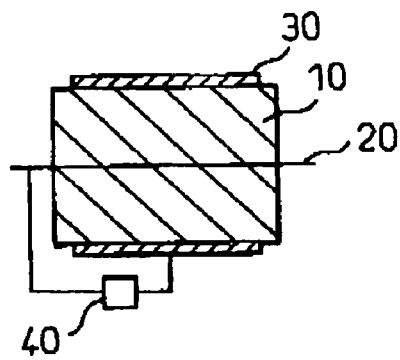

The plasma reactor used for the exhaust gas purifying apparatus of the present invention may be any kind of plasma reactor which allows the exhaust gas therethrough, e.g. the plasma reactor shown in FIGS. 3a and 3b. FIG. 3a shows a perspective view and FIG. 3b shows a side sectional view of the plasma reactor.

The plasma reactor can generate plasma by a discharge between a center electrode 20 and outer electrode 30, these electrodes 20 and 30 being connected to a power supply 40. The exhaust gas to be treated is passed through a cylindrical passage 10 surrounded by the outer electrode 30. The $H_2O$ and/or HC adsorbent, and optionally $NO_x$ adsorbent, may be positioned in the cylindrical passage 10.

The center electrode 20 is made of a material that makes it possible to apply a voltage between the center electrode 20 and the outer electrode 30. The material may be electrically conductive material, electrically semi-conductive material etc. and especially, a metal such as Cu, W, stainless steel, Fe, PT and Al, the stainless steel being most preferable due to its durability and low cost. The center electrode 20 may be a metal wire, but it may be a hollow bar.

The outer electrode 30 is made of a material that makes it possible to apply a voltage between the center electrode 20 and the outer electrode 30. The material may be the material described for the center electrode 20. The outer electrode 30 may be made by surrounding a mesh or foil of these materials around the cylindrical passage 10, or by applying a conductive paste on the circumference surface of the cylindrical passage 10.

The electric power supply 40 may be one supplying a pulse or constant direct current (DC), or alternating current (AC) voltage. A voltage applied between the center electrode 20 and the outer electrode 30 and the pulse period of the applied voltage may be 50 kv and 2000 Hz. The center electrode 20 may be a cathode or anode.

The electric power supply 40 may apply a high voltage between the center electrode 20 and outer electrode 30 in order to generate discharge and then plasma therebetween. The electric power supply 40 may apply a DC voltage, AC voltage, a voltage having a periodic waveform, etc. between the electrodes. Preferably, DC pulse voltage is applied since it can generate a stable corona electric discharge. The applied voltage, pulse width and pulse period of the DC pulse voltage may be optionally determined as long as it generates a corona electric discharge. Preferably, the applied voltage and pulse period are respectively a high voltage and short period in order to generate a corona electric discharge, though those parameters may be restricted by the design of the apparatus, an economical interest, etc.

Figure 4A:
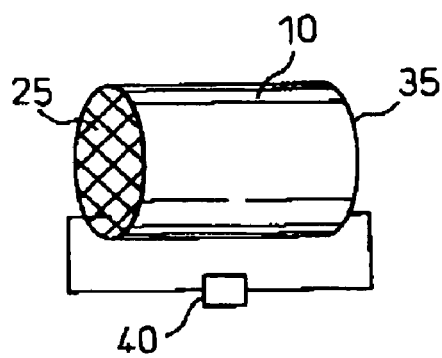
FIGS. 4a and 4b are respectively a perspective view and a cross sectional view of another plasma reactor which can be used for the present exhaust gas purifying apparatus.
Figure 4B:
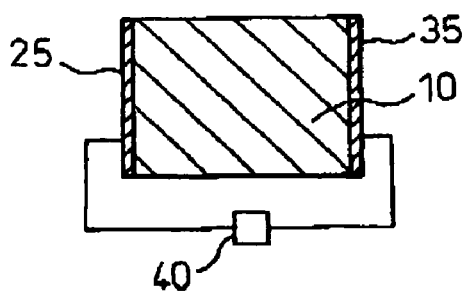

The plasma reactor used for the exhaust gas purifying apparatus of the present invention may be the plasma reactor shown in FIGS. 4a and 4b. FIG. 4a shows a perspective view and FIG. 4b shows a side sectional view of the plasma reactor.

The plasma reactor can generate plasma by discharging between mesh-like electrodes 25 and 35 which are upstream and downstream of the cylindrical passage 10, these electrodes 25 and 35 being connected to a power supply 40. The exhaust gas to be treated is passed through an upstream mesh-like electrode 25, cylindrical passage 10 and then a downstream-like mesh electrode 35. The $H_2O$ and/or HC adsorbent, and optionally $NO_x$ adsorbent, may be contained in the cylindrical passage 10. The description of the materials used for electrodes, the power supply, etc. of the plasma reactor of FIGS. 3a and 3b may be referred for the plasma reactor of FIGS. 4a and 4b.

The effects of the present invention are shown with regard to the examples, which are not intended to limit the scope of the present invention shown in the claims.

EXAMPLE 1

A plasma reactor shown in FIGS. 3a and 3b was used to determine the effect of a $H_2O$ adsorbent and plasma on a conversion from NO to $NO_2$.

In this example, 2.0 g of silica pellets was contained in the plasma reactor as a $H_2O$ adsorbent. The plasma reactor was located in the reaction tube of an laboratory model-gas analyzer, and the adsorbent temperature was maintained at the temperature of 150° C. A gas comprising 1000 ppm of NO, 10% of $O_2$, 3.0% of $H_2O$ and balance $N_2$ was passed through the plasma reactor to evaluate a conversion ratio from NO to $NO_2$. DC pulse discharge (50 kV, 2000 Hz) was used to generate plasma.

COMPARATIVE EXAMPLE 1

The example 1 was repeated except that the plasma was not generated.

COMPARATIVE EXAMPLE 2

The example 1 was repeated except that the $H_2O$ adsorbent was not contained in the plasma reactor.

COMPARATIVE EXAMPLE 3

The example 1 was repeated except that the plasma was not generated and the $H_2O$ adsorbent was not contained in the plasma reactor.

The results obtained in example 1 and comparative examples 1 to 3 are shown in the following Table 1.

TABLE 1

| | NO → $NO_2$ conversion ratio | |
|---|---|---|
| | no plasma | plasma |
| no $H_2O$ adsorbent | 0 | 18 |
| $H_2O$ adsorbent | 1 | 40 |

As seen from Table 1, the example 1 according to the present invention (plasma+$H_2$ adsorbent) provides a much better performance than comparative example 1 ($H_2O$ adsorbent only), comparative example 2 (plasma only) and comparative example 3 (without plasma and $B_2O$ adsorbent).

EXAMPLE 2

A plasma reactor shown in FIGS. 3a and 3b was used to determine the effect of a HC adsorbent and plasma on a conversion from NO to $NO_2$.

In this example, 2.0 g of zeolite (ZSM-5) pellets was contained in the plasma reactor as a HC adsorbent. The plasma reactor was located in the reaction tube of an laboratory model-gas analyzer, and the adsorbent temperature was maintained at the temperature of 150° C. A gas comprising 1000 ppm of NO, 300 ppm of $C_3H_6$, 10% of $O_2$, 3.0% of $H_2O$ and balance $N_2$ was passed through the plasma reactor to evaluate a conversion ratio from NO to $NO_2$. DC pulse discharge (50 kV, 2000 Hz) was used to generate plasma.

COMPARATIVE EXAMPLE 4

The example 2 was repeated except that the plasma was not generated.

COMPARATIVE EXAMPLE 5

The example 2 was repeated except that the HC adsorbent was not contained in the plasma reactor.

COMPARATIVE EXAMPLE 6

The example 2 was repeated except that the plasma was not generated and the HC adsorbent was not contained in the plasma reactor.

The results obtained in example 2 and comparative examples 4 to 6 are shown in the following Table 2.

TABLE 2

| | NO → $NO_2$ conversion ratio | |
|---|---|---|
| | no plasma | plasma |
| no HC adsorbent | 0 | 29 |
| HC adsorbent | 10 | 71 |

As seen from Table 2, the example 1 according to the present invention (plasma+HC adsorbent) provides a much better performance than comparative example 4 (HC adsorbent only), comparative, example 5 (plasma only) and comparative example 6 (without plasma and HC adsorbent).

Although the present invention has been fully described by way of the example with reference to the accompanying drawings, it should be understood that various changes and modifications will be apparent to those skilled in the art. Therefore, such changes and modifications can be made within the scope of the present invention hereinafter defined.

The invention claimed is:

1. An exhaust gas purifying apparatus, comprising:
   a plasma reactor containing at least one of a $H_2O$ adsorbent and a HC adsorbent, and
   a $NO_x$ adsorbent located downstream of said plasma reactor, wherein:
   said $NO_x$ adsorbent has a $NO_x$ purifying catalyst, or the exhaust gas purifying apparatus has the $NO_x$ purifying catalyst located downstream of the $NO_x$ adsorbent, and
   plasma is generated in the plasma reactor only when a temperature of said $NO_x$ purifying catalyst is lower than a predetermined temperature to facilitate the conversion of NO to $NO_2$ in the exhaust gas.

2. The exhaust gas purifying apparatus according to claim 1, wherein said predetermined temperature is 300° C.

3. The exhaust gas purifying apparatus according to claim 1, wherein said at least one of the $H_2O$ adsorbent and the HC adsorbent is selected from the group consisting of alumina, silica, zeolite, zirconia and meso-porous silica, and combinations thereof.

4. The exhaust gas purifying apparatus according to claim 1, wherein said $NO_x$ adsorbent is selected from the group consisting of zirconia and ceria, and a combination thereof.

5. An exhaust gas purifying apparatus, comprising:
a plasma reactor containing at least one of a $H_2O$ adsorbent and a HC adsorbent, and a $NO_x$ adsorbent, wherein:
said $NO_x$ adsorbent has a $NO_x$ purifying catalyst, or the exhaust gas purifying apparatus has the $NO_x$ purifying catalyst located downstream of the $NO_x$ adsorbent, and
plasma is generated in the plasma reactor only when a temperature of said $NO_x$ purifying catalyst is lower than a predetermined temperature to facilitate the conversion of NO to $NO_2O$ in the exhaust gas.

6. The exhaust gas purifying apparatus according to claim 5, wherein said predetermined temperature is 300° C.

7. The exhaust gas purifying apparatus according to claim 5, wherein said at least one of the $H_2O$ adsorbent and the HC adsorbent is selected from the group consisting of alumina, silica, zeolite, zirconia and meso-porous silica, and combinations thereof.

8. The exhaust gas purifying apparatus according to claim 5, wherein said $NO_x$ adsorbent is selected from the group consisting of zirconia and ceria, and a combination thereof.

* * * * *